United States Patent
Wang et al.

(10) Patent No.: US 8,591,123 B2
(45) Date of Patent: Nov. 26, 2013

(54) CONNECTOR SYSTEM HAVING ELECTRICAL AND OPTICAL LINKS WITH OPTICAL LINK CLEANER

(71) Applicant: Avago Technologies General IP (Singapore) Pte. Ltd., Singapore (SG)

(72) Inventors: Tak Kui Wang, Cupertino, CA (US); Ronald T. Kaneshiro, Los Altos, CA (US); Chung-Yi Su, Fremont, CA (US); Craig T. Cummings, Cupertino, CA (US); Ye Chen, San Jose, CA (US); Bing Shao, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/776,385

(22) Filed: Feb. 25, 2013

(65) Prior Publication Data
US 2013/0163938 A1  Jun. 27, 2013

Related U.S. Application Data

(62) Division of application No. 12/815,643, filed on Jun. 15, 2010, now Pat. No. 8,403,568.

(51) Int. Cl.
*G02B 6/36* (2006.01)
*G02B 6/00* (2006.01)

(52) U.S. Cl.
USPC ............................................ 385/76; 385/139

(58) Field of Classification Search
USPC ................................................... 385/76, 139
See application file for complete search history.

(56) References Cited

U.S. PATENT DOCUMENTS

| | | | |
|---|---|---|---|
| 4,807,955 A | 2/1989 | Ashman et al. | |
| 7,125,287 B1 * | 10/2006 | Chou et al. | 439/660 |
| 7,324,757 B2 | 1/2008 | Wilson et al. | |
| 7,872,873 B2 | 1/2011 | Hiew et al. | |
| 8,226,303 B2 | 7/2012 | Toth | |
| 8,398,314 B2 * | 3/2013 | Ko et al. | 385/93 |
| 8,403,568 B2 * | 3/2013 | Wang et al. | 385/76 |
| 2006/0098921 A1 | 5/2006 | Benaron et al. | |
| 2009/0113090 A1 | 4/2009 | Hochgesang et al. | |
| 2009/0216922 A1 | 8/2009 | Park et al. | |
| 2010/0046891 A1 | 2/2010 | Sabo | |

FOREIGN PATENT DOCUMENTS

WO  2008121731 A1  10/2008

* cited by examiner

*Primary Examiner* — Daniel Petkovsek

(57) ABSTRACT

In a connector system, a first connector is mechanically and optically mateable with a second connector to form one or more optical signal communication links. A wiping cleaner is included on at least one of the first and second connectors for cleaning an optical port of the other of the first and second connectors when the connectors are plugged together. The first and second connectors can further be electrically mateable to provide both optical and electrical signal communication links.

5 Claims, 10 Drawing Sheets

CONNECTOR SYSTEM HAVING ELECTRICAL AND OPTICAL LINKS WITH OPTICAL LINK CLEANER

CROSS-REFERENCE TO RELATED APPLICATION

This is a divisional of U.S. patent application Ser. No. 12/815,643, filed Jun. 15, 2010, now U.S. Pat. No. 8,403,568, the benefit of the filing date of which is hereby claimed, and the specification of which is incorporated herein in its entirety by this reference.

BACKGROUND

In an optical communication system, it is generally necessary to couple an optical fiber to an opto-electronic transmitter, receiver or transceiver device and, in turn, to couple the device to an electronic system such as a switching system or processing system. These connections can be facilitated by modularizing the transceiver device. An opto-electronic transceiver module includes an opto-electronic light source, such as a laser, and an opto-electronic light receiver, such as a photodiode, and may also include various electronic circuitry associated with the laser and photodiode. For example, driver circuitry can be included for driving the laser in response to electronic signals received from the electronic system. Likewise, receiver circuitry can be included for processing the signals produced by the photodiode and providing output signals to the electronic system. The electronic and opto-electronic devices can be mounted on a small circuit board or similar substrate inside the transceiver module housing. The circuit board can include an electrical connector for connecting the opto-electronic transceiver to the external electronic system.

In some modular opto-electronic transceiver systems, an optical plug that terminates an optical fiber cable can be plugged into a socket in the transceiver module housing. When coupled to the transceiver module in this manner, the ends of optical fibers in the plug are optically aligned with optics in the opto-electronic transceiver. The optics couple electronic signals between the fibers and the laser and photodiode. A first fiber, which can be referred to as a transmit fiber, is optically coupled to the laser so that optical signals generated by the transceiver module are transmitted via that transmit fiber. A second fiber, which can be referred to as a receive fiber, is optically coupled to the photodiode so that optical signals received via the receive fiber can be received by the transceiver module.

In some opto-electronic transceiver modules, the optical signal path includes a 90-degree turn. For example, the above-described circuit board on which the laser and photodiode are mounted can be oriented perpendicularly or normal to the axes along which the signals are communicated with the optical fibers in the plug. The laser emits the optical transmit signal in a direction normal to the circuit board, and the photodiode receives the optical receive signal from a direction normal to the circuit board. The above-referenced optics in the transceiver module can include a first lens that collimates the optical transmit signal emitted by the laser and a second lens that focuses the optical receive signal upon the photodiode. A minor or similar reflective element in the transceiver module can redirect the signals emitted by the laser and received by the photodiode at 90-degree angles with respect to the circuit board.

Connector systems have been suggested that include both an optical signal path and an electrical signal path. When the plug connector of such a system is plugged into the socket or receptacle connector of such a system, optical signals can be communicated in parallel with electrical signals between the plug and socket connectors. It has been suggested to provide such a connector system in a configuration similar to a Universal Serial Bus (USB) configuration.

SUMMARY

Embodiments of the present invention relate to a connector system in which a first connector is mechanically and optically mateable with a second connector to form one or more optical signal communication links. A wiping cleaner is included for cleaning the optical link. In some embodiments, the first and second connectors can further be electrically mateable to provide both optical and electrical signal communication links.

In an exemplary embodiment, a first connector has a first-connector mating portion and a first-connector optical interface that includes at least one first-connector optical port. The first-connector optical port is located on a surface of the first-connector mating portion rearward of a distal end of the first-connector mating portion.

The second connector has a second-connector mating portion, a second-connector optical interface that includes at least one second-connector optical port, and a second-connector wiping cleaner. The second-connector optical port is located on a surface of the second mating portion rearward of a distal end of the second-connector mating portion.

The first-connector and second-connector mating portions are mechanically and optically mateable with each other by plugging one of them into the other (e.g., one is plug-like, and the other is socket-like). As the first-connector and second-connector mating portions approach a fully mated position, a first-connector optical port and a second-connector optical port approach optical alignment with one another along an approach path. In an exemplary embodiment, the approach path is a straight line, corresponding to the direction in which the first and second connectors are plugged together. In the fully mated position, the first-connector optical port is optically aligned with the second-connector optical port. The second-connector wiping cleaner is located along the approach path on a surface of the second-connector mating portion between the distal end of the second-connector mating portion and the second-connector optical port. That is, at least a portion of the second-connector wiping cleaner intersects the approach path. Thus, as the first-connector and second-connector mating portions approach the fully mated position, the second-connector wiping cleaner wipes the first optical port.

Wiping an optical port in this manner can remove contaminants and thus promote good optical signal communication between a first-connector optical port and a second-connector optical port. In embodiments in which both the first and second connectors include respective wiping cleaners, the second-connector wiping cleaner wipes the first-connector optical port, and the first-connector wiping cleaner wipes the second-connector optical port.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
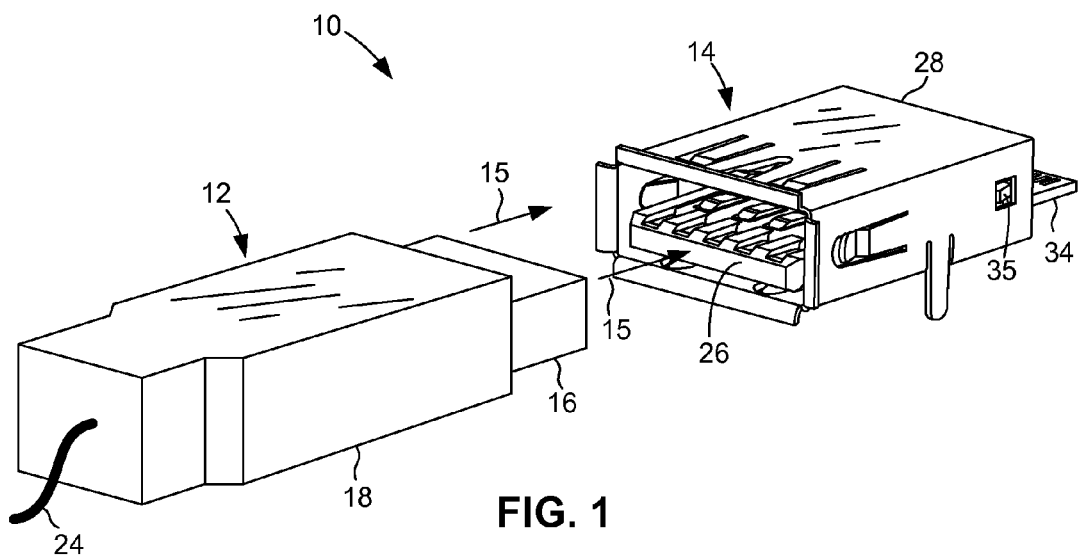
FIG. 1 is a perspective view of a connector system having a first connector and a second connector, in accordance with an exemplary embodiment of the invention.
Figure 2:
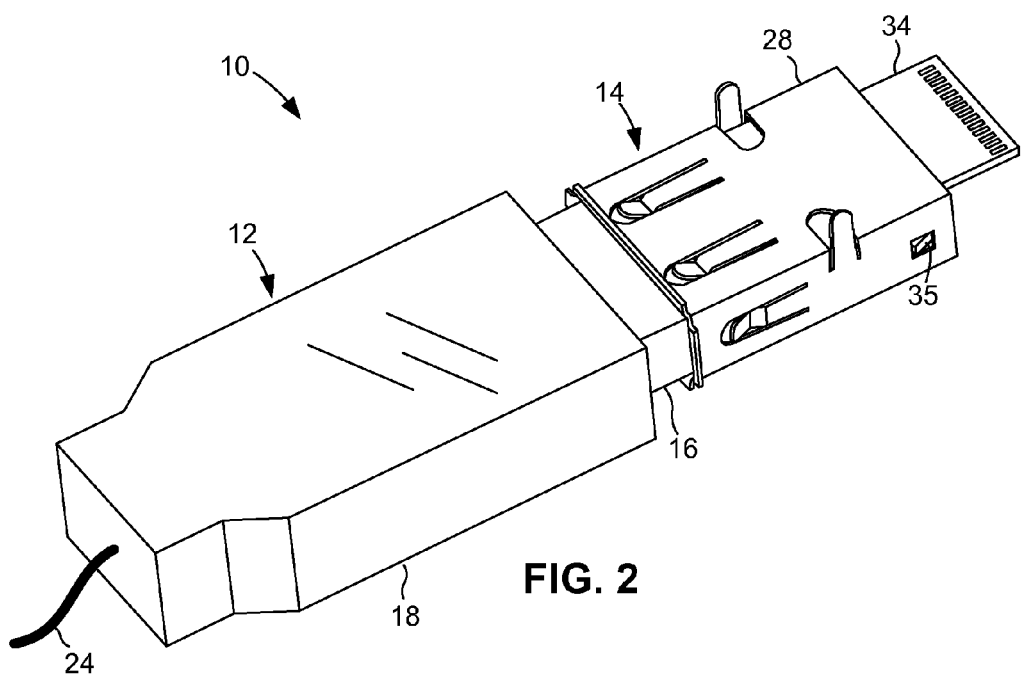
FIG. 2 is similar to FIG. 1, showing the first and second connectors in a mated position.

As illustrated in FIG. 1, in an illustrative or exemplary embodiment of the invention, a connector system 10 includes a plug-like first connector 12 and a socket-like second connector 14. As illustrated in FIGS. 1-2, first connector 12 can be plugged into second connector 14 (in a plugging direction 15 indicated by arrows).

First connector 12 includes a first-connector assembly 16 and a first-connector body 18. As further illustrated in FIG. 3, first-connector assembly 16 includes a rectangular or box-like electromagnetic interference (EMI) shield 20 and a first-connector mating portion 22. The distal end of EMI shield 20 is open and exposes the distal end of first-connector mating portion 22. EMI shield 20 can be made of formed sheet metal. First-connector body 18 is made of a suitable material, such as molded plastic, and encloses first-connector assembly 16. A cable 24 extends from the rear or proximal end of first connector 12. First connector 12 is described in further detail below. For purposes of reference, a point between the distal and proximal ends of a connector or element thereof described herein can be referred to as "rearward" of the distal end and "forward" of the proximal end.

It should be noted that although in the exemplary embodiment first connector 12 is plug-like and second connector 14 is socket-like, such that a portion of first connector 12 can be plugged into a portion of second connector 14, in other embodiments the features described herein as those of first connector 12 can instead be provided in a socket-like first connector, and conversely, the features described herein as those of second connector 14 can instead be provided in a plug-like second connector. Structural limitations should not be inferred into such other embodiments by the use of the terms "plug" and "socket" herein with regard to the exemplary embodiment.

Figure 4:
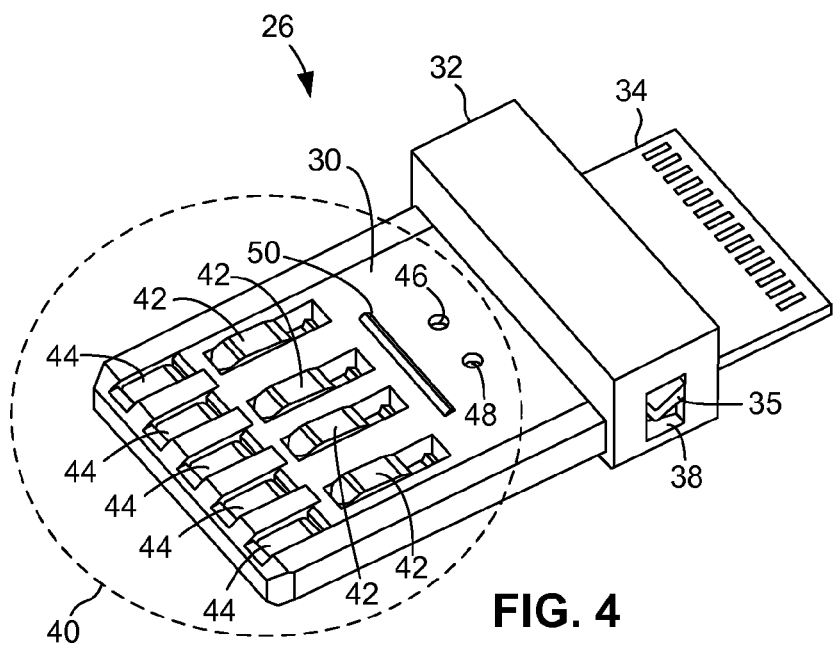
FIG. 4 is a perspective view of the top of the second connector in FIG. 1, with the shield removed to show the interior assembly.

Second connector 14 includes a second-connector assembly 26, shown separately in FIG. 4. Second connector 14 also includes an EMI shield 28 that houses second-connector assembly 26 as shown in FIGS. 1-2, but assembly 26 is shown separately in FIG. 4 for clarity. The EMI shield 28 can be made of formed sheet metal and, in addition to providing EMI shielding, provides a means for second connector 14 to mechanically mate with and retain first connector 12.

Second-connector assembly 26 includes a substantially planar or tongue-like second-connector electrical contact holder 30, a second-connector body 32, and a printed circuit board 34. Second connector body 32 has ears 35 that snap into corresponding openings in EMI shield 28 (FIGS. 1-2) to facilitate attachment of EMI shield 28 to second-connector assembly 26. Second-connector electrical contact holder 30 has ears 36 that snap into openings 38 in second-connector body 32 to facilitate assembly of second-connector assembly 26. The distal end of second-connector assembly 26 defines a second-connector mating portion 40 that, as described below, mates with a similar portion of first connector 12.

As described in further detail below, a second-connector optical transmit port 46, and a second-connector optical receive port 48, and a second-connector wiping cleaner 50 are all located on second connector mating portion 40. Second-connector optical transmit port 46 and a second-connector optical receive port 48 define a second-connector optical signal interface.

Figure 5:
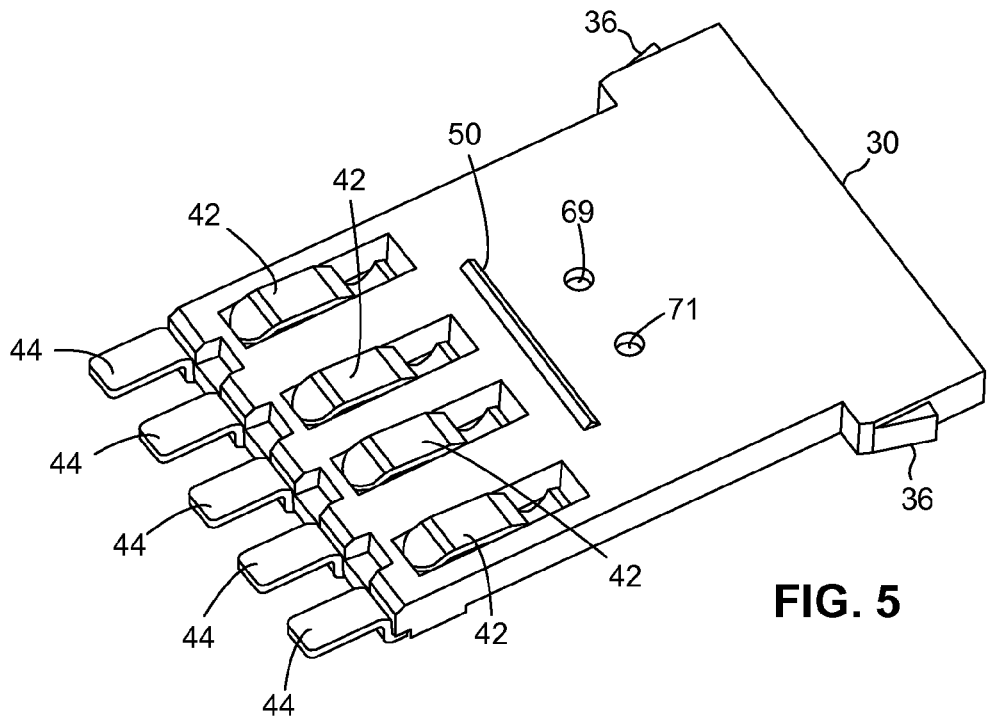
FIG. 5 is a perspective view of the contact holder and electrical contacts of the second connector assembly of FIG. 4.
Figure 6:
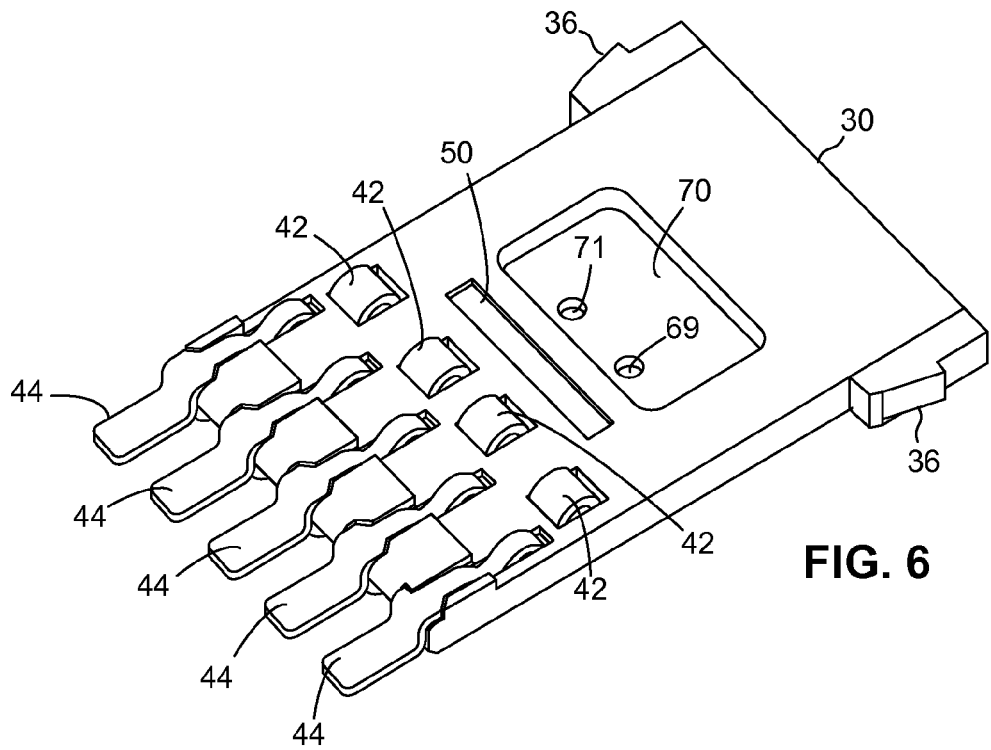
FIG. 6 is similar to FIG. 5, showing the bottom of the contact holder and electrical contacts.

As further illustrated in FIGS. 5-6, a plurality of elongated or finger-like second-connector electrical contacts 42 and 44 are mounted on second-connector electrical contact holder 30 in the region defining second-connector mating portion 40 (FIG. 4). Connector system 10 has a configuration similar to that known as the Universal Serial Bus (USB). In the exemplary embodiment, five second-connector secondary electrical contacts 44 are arranged in another parallel array of a size and configuration compatible with the USB 3.0 connector standard. Similarly, four second-connector secondary electrical contacts 42 are arranged in a parallel array of a size and configuration compatible with the USB 2.0 connector standard. Thus, connector system 10 is intended to be compatible with aspects of both the USB 2.0 and 3.0 standards. In other embodiments, a connector system in accordance with the present invention can have electrical contacts arrayed or otherwise arranged in any other suitable manner to comport with any other standard or desired configuration. Second-connector electrical contacts 42 and 44 define a second-connector electrical signal interface.

It should be noted that the use of the term "mounted on" to describe the location or position of second-connector electrical contacts 42 and 44 with respect to second-connector electrical contact holder 30 is used for purposes of convenience, as portions of second-connector electrical contacts 42 and 44 may be perceived as located either "on" or "in" second-connector electrical contact holder 30. Note that portions of second-connector electrical contacts 42 and 44 are recessed within second-connector electrical contact holder 30 to retain them, while other portions may be flush with a surface or extend above a surface of second-connector electrical contact holder 30. The use herein of the term "in" with regard to the relationship between two elements in the exemplary embodiment is intended to include the term "on" within its scope of meaning, unless stated or clearly indicated otherwise. Conversely, the use herein of the term "on" with regard to the relationship between two elements in the exemplary embodiment is intended to include the term "in" within its scope of meaning, unless stated or clearly indicated otherwise.

Although there are various types of USB connectors having various configurations, a USB connector system is generally characterized by an elongated, shielded plug connector that plugs into a shielded socket connector having a parallel array of elongated or finger-like electrical contacts held in a tongue-shaped electrical contact holder, where a similar tongue-shaped electrical contact holder that is enclosed within the shield of the plug connector slides into a mated position against the electrical contact holder of the socket connector. To the extent that the term "USB," "USB-like" or a similar term may be used herein, the term is intended to refer to such a structure or configuration.

Second-connector wiping cleaner 50 is mounted on the top of second-connector electrical contact holder 30. Note in FIG. 6 that second-connector wiping cleaner 50 extends into second connector electrical contact holder 30, and that the non-wiping side of second-connector wiping cleaner 50 is visible from the bottom of second-connector electrical contact holder 30. Second-connector wiping cleaner 50 has an elongated, bar-like shape, with a wiping side or edge that is tapered to a ridge, like a squeegee, windshield wiper, etc. Second-connector wiping cleaner 50 can be made of a soft material suitable for wiping, such as, for example, rubber or polypropylene. The wiping action that occurs when connectors 12 and 14 are mated is described below.

Figure 7:
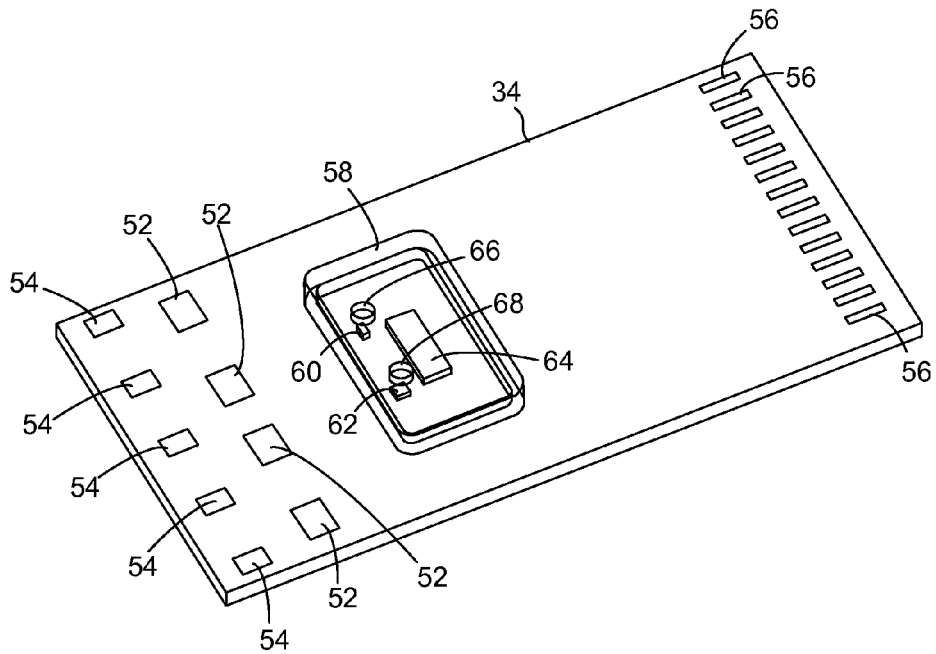
FIG. 7 is a perspective view of the circuit board of the assembly of FIG. 4.

As illustrated in FIG. 7, printed circuit board 34 includes a plurality of forward contact pads 52 and 54 and a plurality of rearward contact pads 56. Rearward contact pads 56 are used to electrically couple connector 14 to an external electronic system (not shown) that may be of a type to which it is known to connect conventional opto-electronic transceiver modules. Mounted on printed circuit board 34 are a light source 60, such as a laser, a light receiver 62, such as a photodiode, and an integrated circuit chip 64 that can include driver and receiver circuitry. A lens device 58 made of an optically transparent material is mounted on printed circuit board 34 over light source 60, light receiver 62, and integrated circuit chip 64. Lens device 58 has two protuberances 66 and 68 on its outer surface that are aligned with light source 60 and light receiver 62, respectively. The distal ends of protuberances 66 and 68 are flat. Although not shown for purposes of clarity, a collimating lens is formed within lens device 58 in optical alignment with light source 60 and protuberance 66. Likewise, a focusing lens is formed within lens device 58 in optical alignment with light receiver 62 and protuberance 68.

Figure 8:
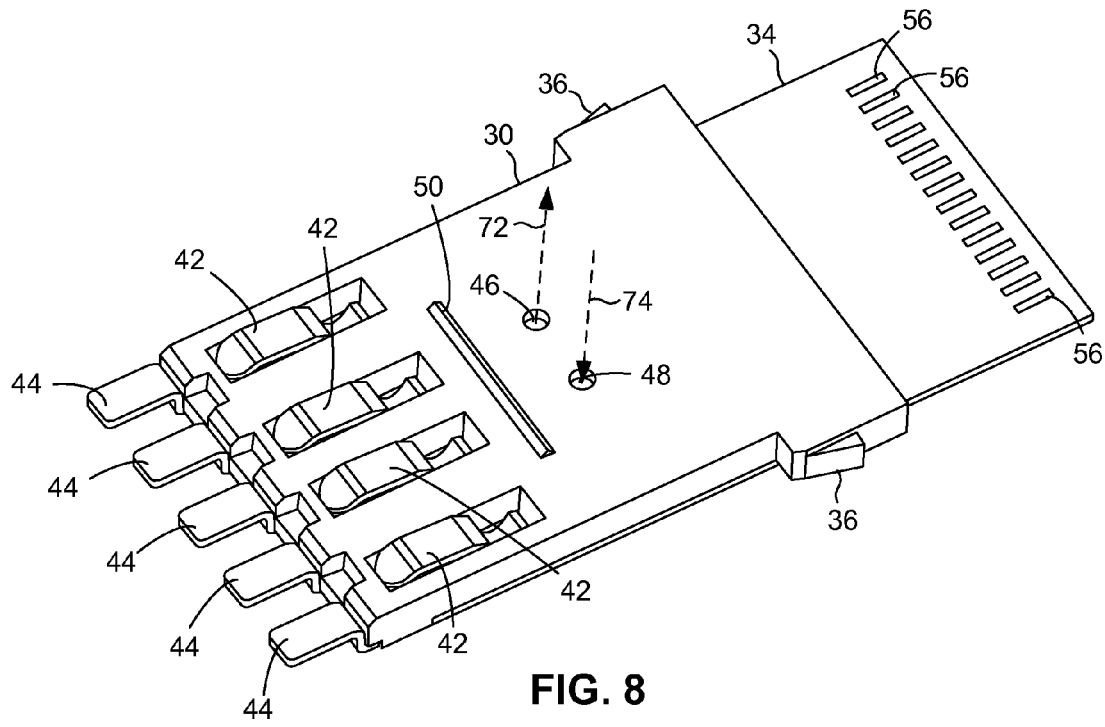
FIG. 8 is a perspective view showing the circuit board of FIG. 7 assembled to the contact holder of FIGS. 5-6.

The portion of second-connector assembly 26 shown in FIG. 8 can be assembled by mounting second-connector electrical contact holder 30 on printed circuit board 34. Mounted in the manner illustrated, lens device 58 fits into a recess 70 (FIG. 6) on the bottom of second-connector electrical contact holder 30. Furthermore, when mounted in this manner, protuberances 66 and 68 fit within openings 69 and 71 (FIGS. 5-6), respectively, in second-connector electrical contact holder 30 to define second-connector optical transmit port 46 and second-connector optical receive port 48, respectively. The ends of protuberances 66 and 68 are flat and are flush with the top of second-connector electrical contact holder 30.

Also, when second-connector electrical contact holder 30 is mounted on printed circuit board 34, forward contact pads 52 and 54 of printed circuit board 34 (FIG. 7) contact second-connector electrical contacts 42 and 44, respectively. Second-connector body 32 (FIG. 4) can then be attached to the resulting (FIG. 8) portion of second-connector assembly 26. The completed second-connector assembly 26 (FIG. 4) can then be mounted in EMI shield 28 to form second connector 14 (FIGS. 1-2).

In operation, optical signals generated by light source 60 are emitted through second-connector optical transmit port 46 along a second-connector optical transmit axis 72, and optical signals received through second-connector optical receive port 48 along a second-connector optical receive axis 74 impinge upon light receiver 62. Note that the use of the terms "transmit" and "receive" herein are relative to the transmission and reception of optical signals by light source 60 and light receiver 62, respectively.

Figure 9:
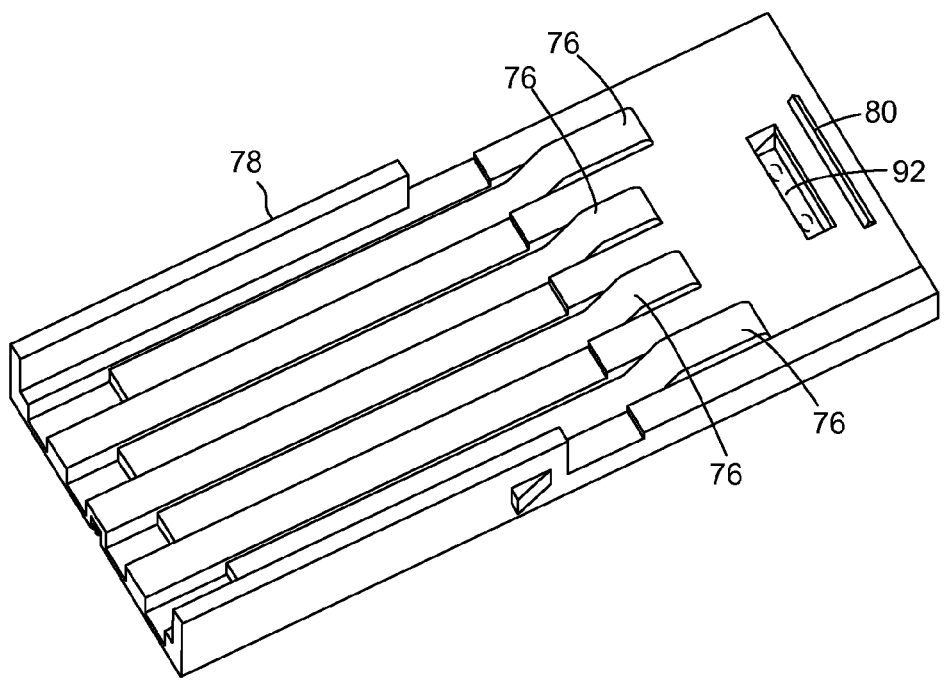
FIG. 9 is a bottom perspective view of the contact holder and electrical contacts of the first connector in FIG. 1.

As illustrated in FIG. 9, a plurality of elongated, finger-like first-connector electrical contacts 76 (for communicating, for example, USB 2.0 signals) are retained in the bottom of a first-connector electrical contact holder 78, which can be made of a suitable material such as plastic. A first-connector wiping cleaner 80 is mounted on the bottom of first-connector electrical contact holder 78 near the distal end that defines first-connector mating portion 22. Note in FIG. 10 that a non-wiping portion of first-connector wiping cleaner 80 extends into first-connector electrical contact holder 78, and that the non-wiping side of first-connector wiping cleaner 80 is visible from the top of first-connector electrical contact holder 78. First-connector wiping cleaner 80 can have the same structure and be made of the same material as the above-described second-connector wiping cleaner 50.

Figure 10:
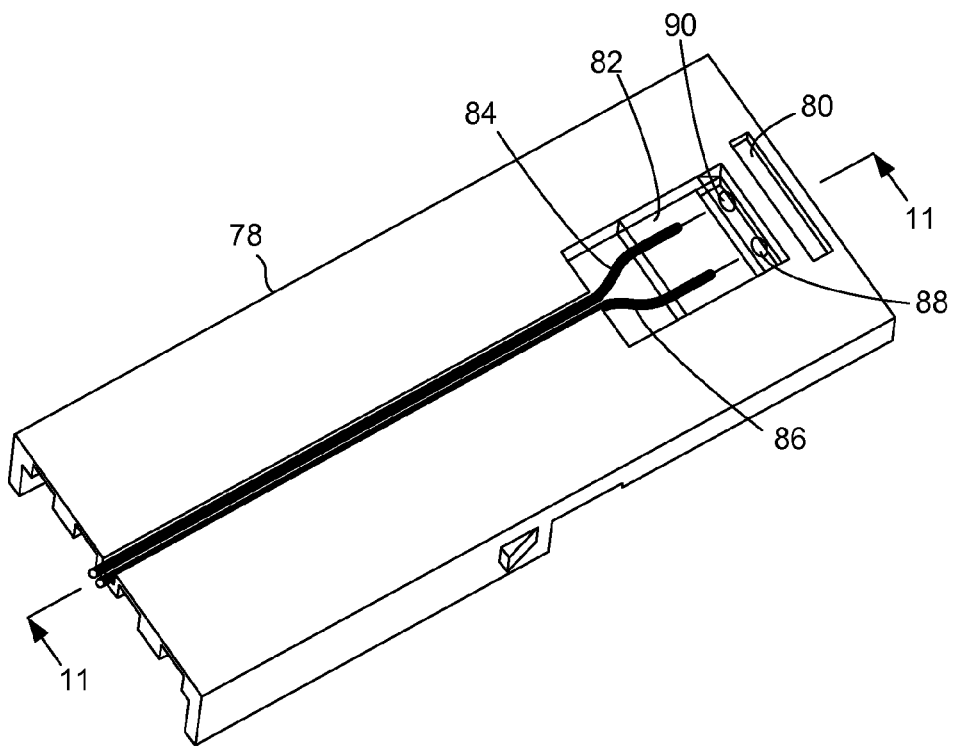
FIG. 10 is similar to FIG. 9, showing the top of the contact holder and electrical contacts.
Figure 11:
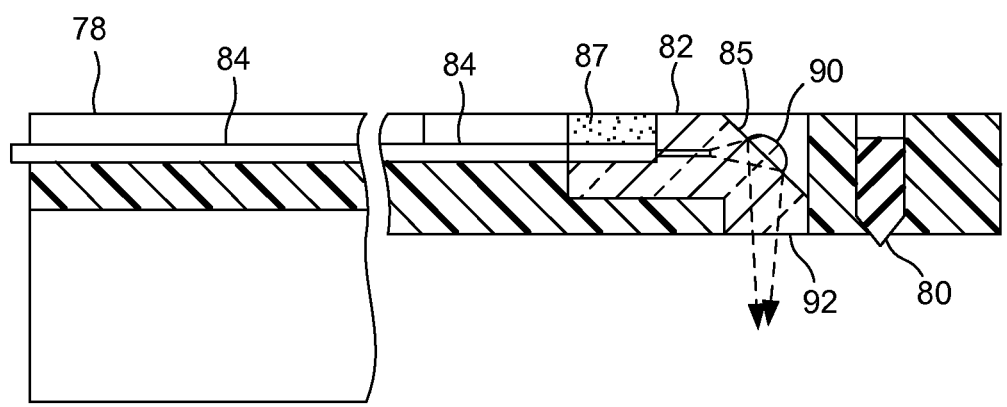
FIG. 11 is a sectional view taken on line 11-11 of FIG. 10.

As illustrated in FIGS. 10-11, a reflector block 82 is mounted in a recess in the top of first-connector electrical contact holder 78. The optical surface 85 at the front of reflector block 82 that reflects the light is shown in the sectional view of reflector block 82 in FIG. 11. A transmit optical fiber 84 and receive optical fiber 86 that are included in cable 24 (FIGS. 1-3) terminate, i.e., have ends, inside reflector block 82. Reflector block 82 can be made of a moldable optical thermoplastic, such as, for example, ULTEM® polyetherimide from SABIC (formerly General Electric Plastics Division). The ends of transmit and receive optical fibers 84 and 86 lie in respective grooves in the rear of reflector block 82, which can be filled with an optically transparent adhesive 87 (FIG. 11) to secure the ends of transmit and receive optical fibers 84 and 86 in reflector block 82. The cladding at the extreme end of each of transmit and receive optical fibers 84 and 86 is removed to expose the core, which fits into a bore in reflector block 82, for better optical coupling between the fiber ends and optical surface 85. Note that optical surface 85 is oriented at an angle of 45 degrees with respect to the optical axes of the ends of transmit and receive optical fibers 84 and 86. Also, when connectors 12 and 14 are mated as described below, optical surface 85 is oriented at an angle of 45 degrees with respect to second-connector optical transmit and receive axes 72 and 74 (FIG. 8).

Figure 12:
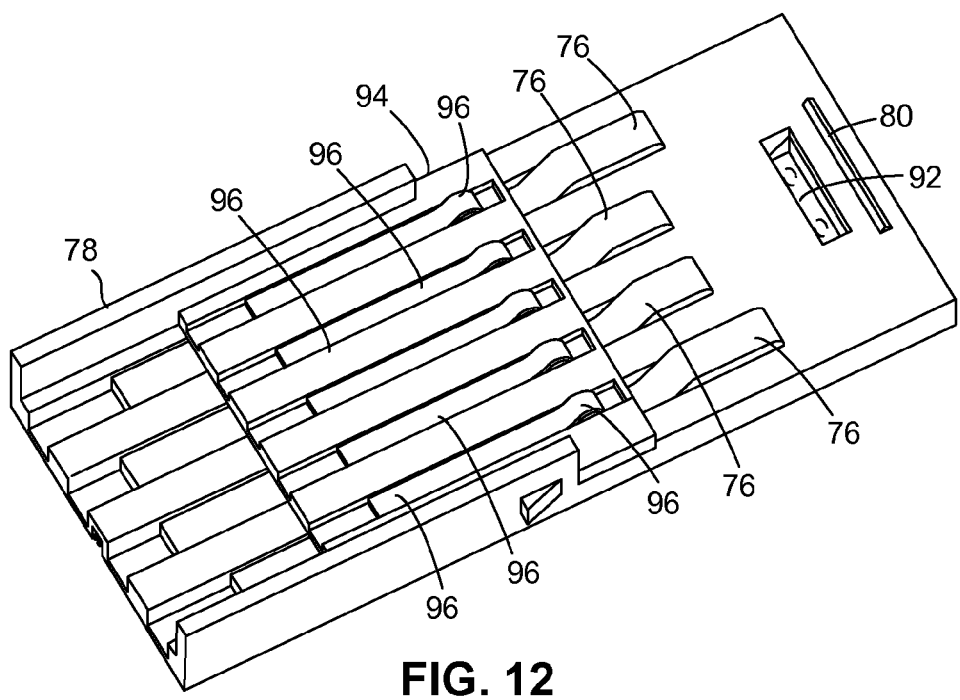
FIG. 12 is a perspective view of the contact holder of FIGS. 9-11 assembled to a secondary contact holder.
Figure 13:
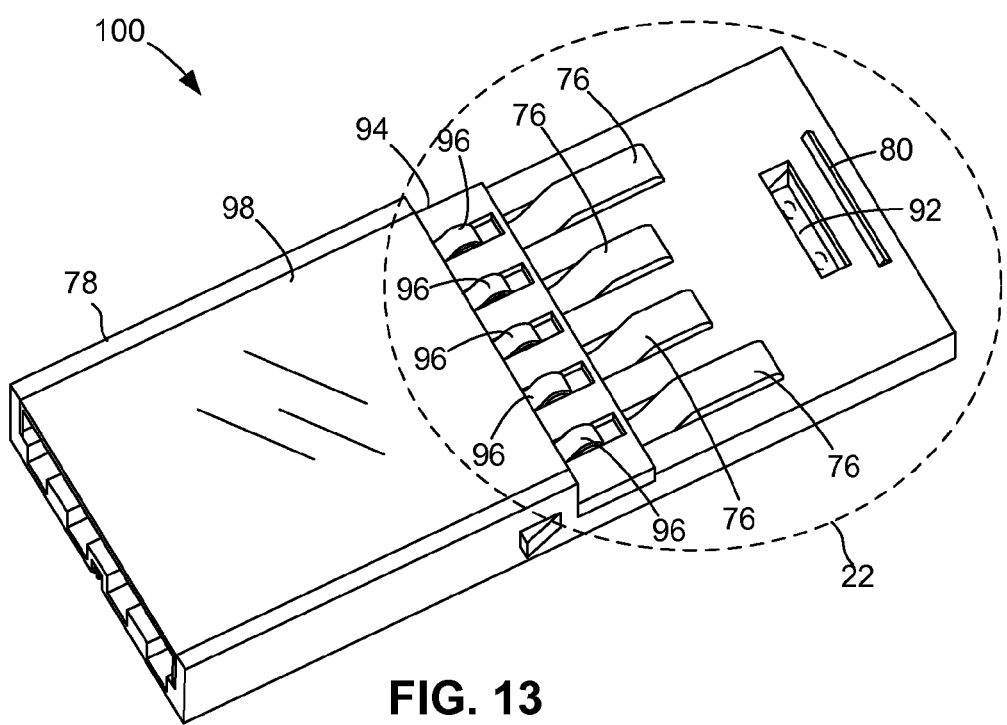
FIG. 13 is a perspective view of the assembly of FIG. 12 with a cover attached.

As illustrated in FIGS. 10-11, a collimating lens 88 and a focusing lens 90 are formed on optical surface 85 of reflector block 82 in alignment with the respective optical axes of the ends of transmit and receive optical fibers 84 and 86, respectively. Collimating lens 88 and focusing lens 90 can be total internal reflection (TIR) lenses that are molded into or otherwise unitarily formed with reflector block 82 and reflect light at a 90-degree angle. Thus, collimating lens 88 both collimates the light beam emitted from the end of receive optical fiber 86 and reflects it at a 90-degree angle through first-connector optical transmit and receive port 92. Likewise, the focusing lens 90 both focuses the light that impinges upon it through first-connector optical transmit and receive port 92 and reflects it at a 90-degree angle onto the end of transmit optical fiber 84. As illustrated in FIGS. 9, 12 and 13, a portion of reflector block 82 is visible through a first-connector optical transmit and receive port 92 in the bottom of first-connector electrical contact holder 78. (As collimating lens 88 and focusing lens 90 are not formed on this portion of reflector block 82 but rather on the opposite side of reflector block 82, they may not be well visible through optical transmit and receive port 92 despite the transparency of reflector block 82.) First-connector optical transmit and receive port 92 defines a first-connector optical signal interface. As best shown in FIG. 11, first-connector optical transmit and receive port 92 is defined by the portion of reflector block 82 that fits within an opening in the bottom of first-connector electrical contact holder 78. The flat surface of this portion of reflector block 82 is flush with the bottom of first-connector electrical contact holder 78.

Figure 14:
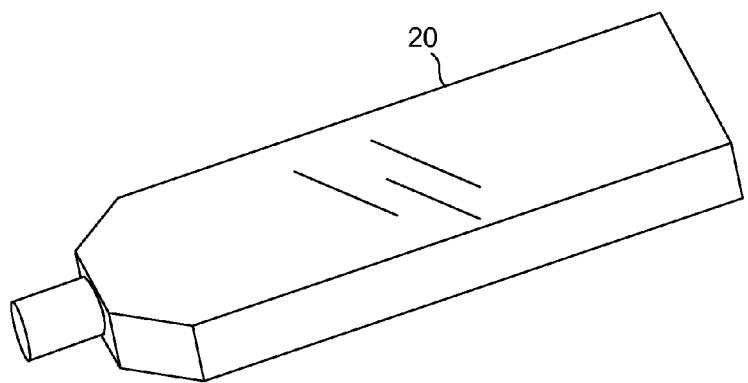
FIG. 14 is a perspective view of the EMI shield of the first connector in FIG. 1.
Figure 15:
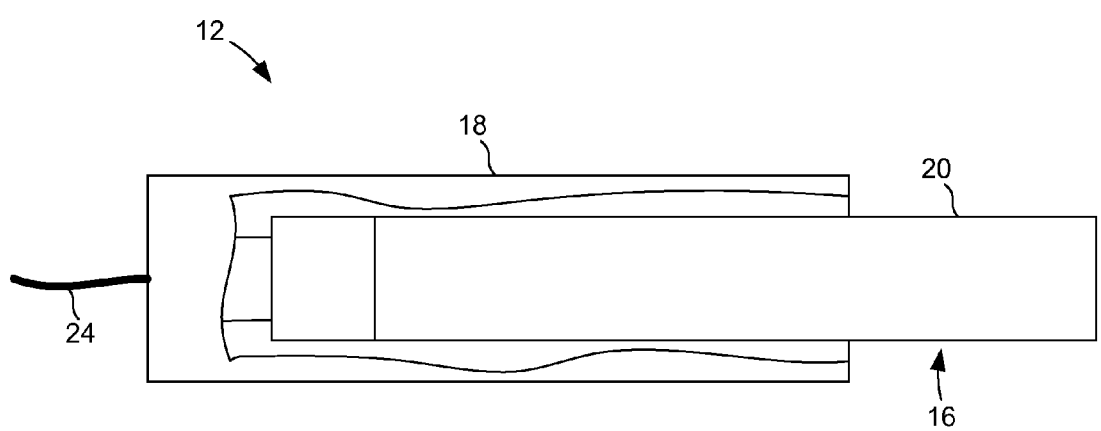
FIG. 15 is a side elevation view of the first connector in FIG. 1, with the plastic housing partially cut away to show the EMI shield.

A secondary electrical contact holder 94 that retains a plurality of elongated or finger-like first-connector secondary electrical contacts 96 (for communicating, for example, USB 3.0 signals) is mounted on the bottom of a first-connector electrical contact holder 78, over proximal portions of electrical contacts 76. A cover 98 is mounted on the bottom of first-connector electrical contact holder 78, covering and securing secondary electrical contact holder 94 and the proximal portions of first-connector electrical contacts 76 and 96, and leaving the distal portions of electrical contacts 76 and 96 exposed. First-connector electrical contacts 76 and 96 define a first-connector electrical signal interface. The resulting second-connector assembly 100 can then be enclosed in EMI shield 20, which is separately shown in FIG. 14. The resulting shielded assembly can then be enclosed in first-connector body 18, as illustrated in FIG. 15.

Figure 16A:
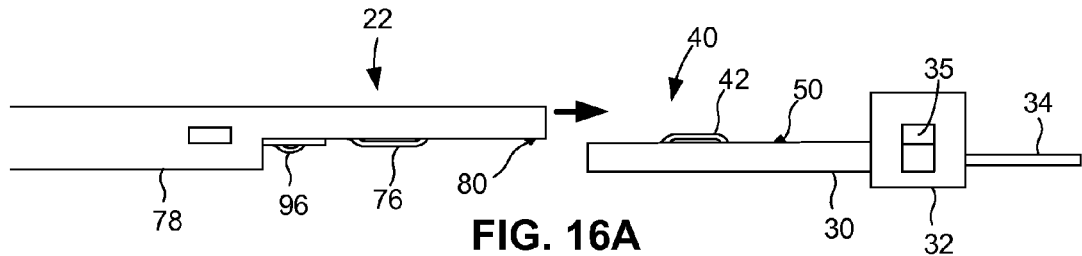
FIG. 16A is a side elevation view showing the mating of the first and second connectors in FIG. 1, with the shields and housings removed to show the mating portions.
Figure 16B:
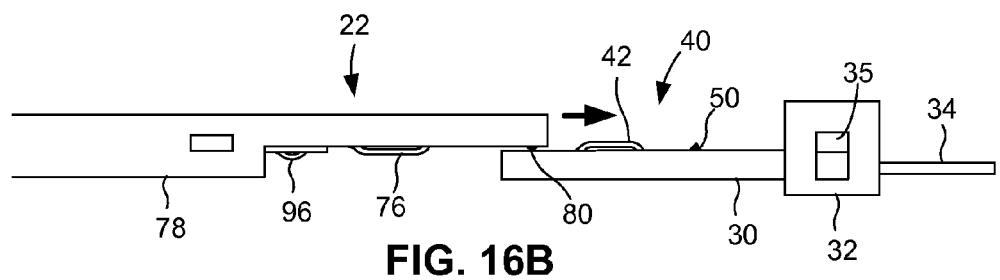
FIG. 16B is similar to FIG. 16A, showing the mating at a point in time later than that of FIG. 16A.

First and second connectors 12 and 14 can be mated as illustrated in FIGS. 16A-16D, which for purposes of clarity show only the internal mating portions of first and second connectors 12 and 14. To mate first and second connectors 12 and 14, a user plugs first connector 12 into second connector 14 in the plugging direction 15 (as shown in FIGS. 1-2). As first connector 12 is plugged into second connector 14, first-connector mating portion 22 approaches second-connector mating portion 40, as shown in FIG. 16A. As first connector 12 is plugged further into second connector 14, the bottom of first-connector electrical contact holder 78 begins to slide over the top of second-connector electrical contact holder 30, as shown in FIG. 16B. At that time, first-connector wiping cleaner 80 on the bottom of first-connector electrical contact holder 78 contacts and thus begins to wipe the top of second-connector electrical contact holder 30. As second-connector optical transmit and receive ports 46 and 48 are located on the top of second-connector electrical contact holder 30, first-connector wiping cleaner 80 thus wipes second-connector optical transmit and receive ports 46 and 48. This wiping action can clean second-connector optical transmit and receive ports 46 and 48 by pushing away any dust or other contaminant that may be on top of second-connector optical transmit and receive ports 46 and 48. Although in the exemplary embodiment first-connector wiping cleaner 80 is oriented perpendicularly to the plugging direction 15, in other embodiments such a wiping cleaner can be oriented obliquely to the plugging direction or other approach path to promote pushing contaminants aside rather than only forward.

Figure 16C:
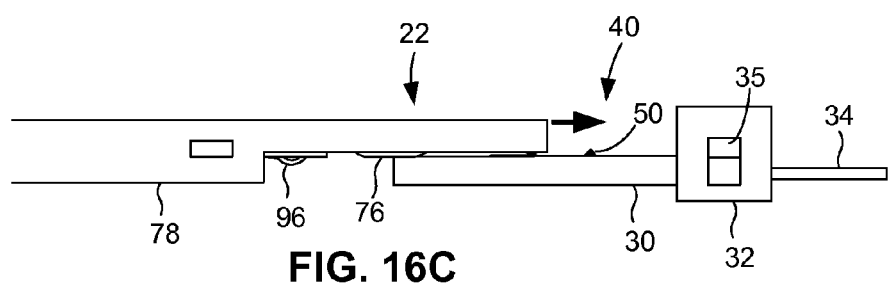
FIG. 16C is similar to FIG. 16A-B, showing the mating at a point in time later than that of FIG. 16B.
Figure 16D:
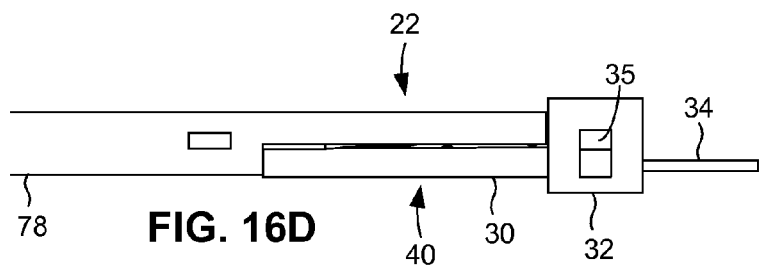
FIG. 16D is similar to FIG. 16A-C, showing the mating at a point in time later than that of FIG. 16C.

As first connector 12 is plugged still further into second connector 14, first-connector mating portion 22 continues to slide over second-connector mating portion 40, as shown in FIGS. 16C-D. Second-connector wiping cleaner 50 on the top of second-connector electrical contact holder 30 contacts and thus wipes the bottom of first-connector electrical contact holder 78. As first-connector optical transmit and receive port 92 is located on the bottom surface of first-connector electrical contact holder 78, second-connector wiping cleaner 50 thus wipes first-connector optical transmit and receive port 92.

In summary, as first connector 12 is plugged into second connector 14 and first-connector mating portion 22 thus slides over second-connector mating portion 40, first-connector wiping cleaner 80 of first-connector mating portion 22 wipes second-connector optical transmit and receive ports 46 and 48 of second-connector mating portion 40 as first-connector wiping cleaner 80 passes over optical transmit and receive ports 46 and 48. Likewise, as first connector 12 is plugged into second connector 14 and first-connector mating portion 22 thus slides over second-connector mating portion 40, second-connector wiping cleaner 50 of second-connector mating portion 40 wipes first-connector optical transmit and receive port 92 of first-connector mating portion 22 as second-connector wiping cleaner 50 passes over first-connector optical transmit and receive port 92.

Figure 3:
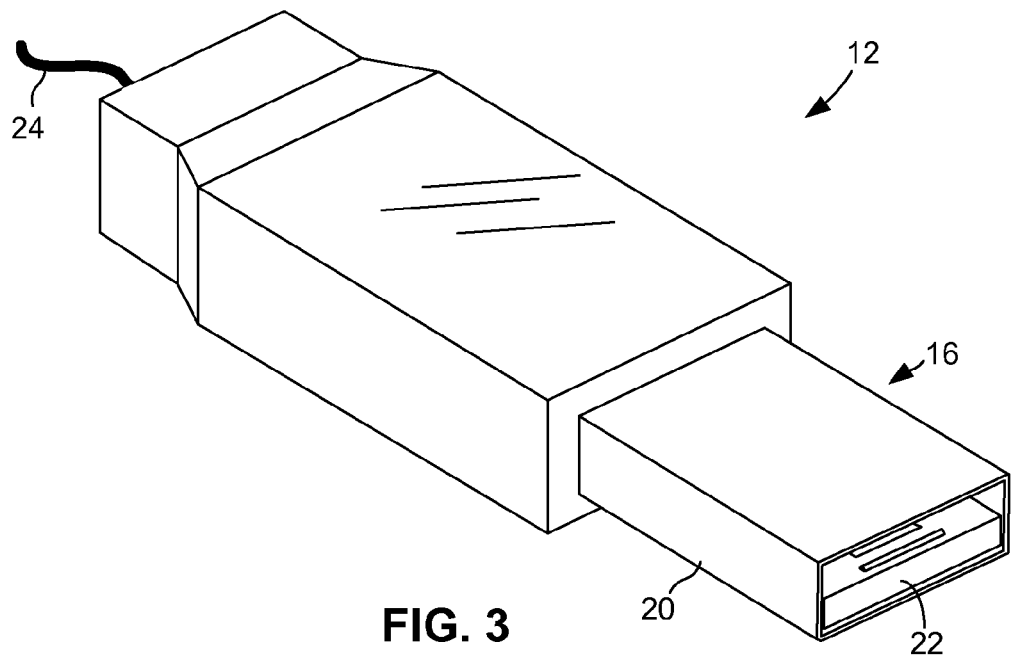
FIG. 3 is a perspective view of the bottom of the first connector in FIG. 1.

The above-described plugging action is completed when first connector 12 is plugged into second connector 14 to an extent that first-connector mating portion 22 and second-connector mating portion 40 reach the fully mated position shown in FIG. 16D. In the fully mated position, first-connector mating portion 22 and second-connector mating portion 40 are mechanically, optically and electrically mated. First-connector mating portion 22 and second-connector mating portion 40 are mechanically mated by virtue of the contact between their respective elements and by the retention provided by EMI shields 20 and 28 (FIGS. 2-3). First-connector mating portion 22 and second-connector mating portion 40 are optically mated by virtue of the optical alignment between second-connector optical transmit and receive ports 46 and 48 (as indicated by second-connector optical transmit and receive axes 72 and 74 in FIG. 8) and first-connector optical transmit and receive port 92. First-connector mating portion 22 and second-connector mating portion 40 are electrically mated by virtue of the electrical contact between first-connector electrical contacts 76 and second-connector electrical contacts 42 and between first-connector secondary electrical contacts 96 and second-connector secondary electrical contacts 44.

Figure 17:
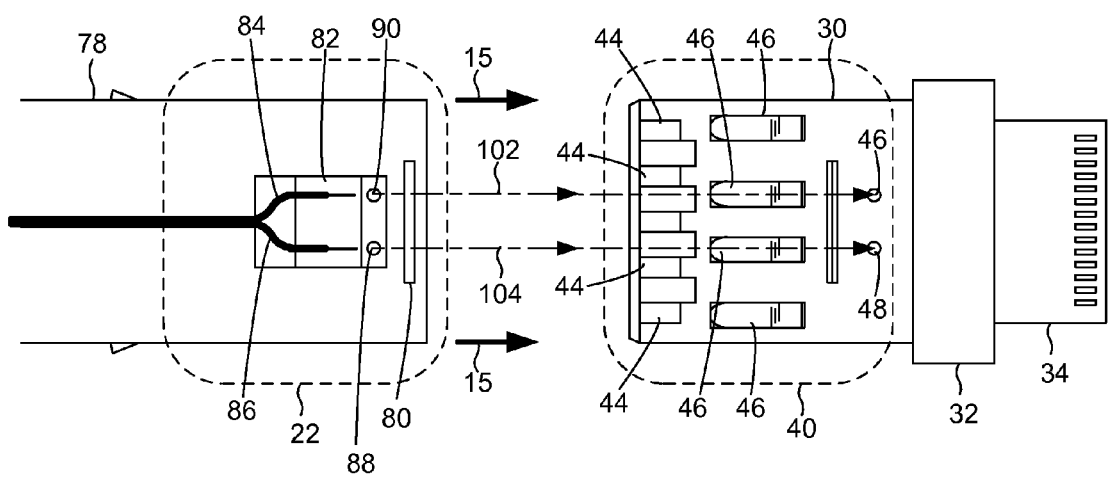
FIG. 17 is a top plan view of the first and second connectors in FIG. 1, with the shields and housings removed to show optical transmit and receive ports approaching alignment with one another along respective approach axes.

Aspects of the mating of connectors 12 and 14 are further described with reference to FIG. 17. As the user plugs connector 12 into connector 14 in plugging direction 15, first-connector mating portion 22 is moved toward second-connector mating portion 40 in plugging direction 15. Accordingly, first-connector transmit and receive port 92 (on the bottom of first-connector mating portion 22 and thus not visible in FIG. 17) moves toward second-connector optical transmit and receive ports 46 and 48 along approach paths 102 and 104, respectively. Each of approach paths 102 and 104 represents a path traversed by first-connector transmit and receive port 92 as first-connector mating portion 22 and second-connector mating portion 40 approach the fully mated position (FIG. 16D) in which first-connector transmit and receive port 92 is optically aligned (as indicated by second-connector optical transmit and receive axes 72 and 74 in FIG. 8) with second-connector optical transmit and receive ports 46 and 48. Note that a portion of first-connector wiping cleaner 80 of first-connector mating portion 22 is located along, i.e., intersects, approach path 102. Likewise, another portion of first-connector wiping cleaner 80 is located along, i.e., intersects, approach path 104. Similarly, a portion of second-connector wiping cleaner 50 of second-connector mating portion 40 is located along, i.e., intersects, approach path 102. Likewise, another portion of second-connector wiping cleaner 50 is located along, i.e., intersects, approach path 104. In other words, during connector mating, at least a portion of a wiping cleaner moves along the path along which two optical ports move into alignment with each other, thereby ensuring that an optical port is wiped. First-connector wiping cleaner 80 being positioned along approach paths 102 and 104 between the distal end of first-connector mating portion 22 and first-connector optical transmit and receive port 92 ensures that first-connector wiping cleaner 80 wipes second-connector optical ports 46 and 48 when connectors 12 and 14 are mated. Likewise, second-connector wiping cleaner 50 being positioned along approach paths 102 and 104 between the distal end of second-connector mating portion 40 and second-connector optical transmit and receive ports 46 and 48 ensures that second-connector wiping cleaner 50 wipes first-connector optical transmit and receive port 92 when connectors 12 and 14 are mated.

Although in the exemplary embodiment first-connector wiping cleaner 80 and second-connector wiping cleaner 50 have elongated, bar-like shapes, in other embodiments they can have other suitable shapes, such as a shorter bar-like shape or a disc-like shape. For example, in such an alternative embodiment (not shown) a disc-shaped wiping cleaner of the same area or larger than an optical port could move along an approach path toward the optical port and wipe the optical port as it passes over the optical port in a manner similar to that in which first-connector wiping cleaner 80 and second-connector wiping cleaner 50 perform the wiping action in the exemplary embodiment.

Note that in the exemplary embodiment each of approach paths 102 and 104 is aligned with plugging direction 15. However, other embodiments (not shown) are contemplated in which an approach path is not aligned with the plugging direction. For example, a connector having a cam-like mechanism can cause two optical ports to approach each other along a path that is oblique to or laterally offset from the plugging direction or along a non-linear path. So long as a wiping cleaner is located along the approach path, the shape of the approach path or relation between the approach path and plugging direction does not impede the wiping action.

Also, although in the exemplary embodiment first-connector wiping cleaner 80 and second-connector wiping cleaner 50 are mounted in fixed relation to first-connector electrical contact holder 78 and second-connector electrical contact holder 30, respectively, in other embodiments wiping cleaners can be mounted in movable relation to the mating portions of their respective connectors. For example, in an alternative embodiment (not shown) a wiping cleaner can be pivotally mounted such that a portion of the wiping cleaner moves onto a portion of the approach path to wipe an optical port during connector mating and then moves aside before the connectors are fully mated.

Once connectors 12 and 14 of connector system 10 are plugged together in the manner described above, connector system 10 (FIGS. 1-2) can operate to transmit and receive optical signals via cable 24. That is, opto-electronic transceiver module 58 (FIG. 7) in connector 14 receives optical signals (e.g., representing digital data) via connector 12 from the receive optical fiber 86 of cable 24. Opto-electronic transceiver module 58 converts the received optical signals into electronic signals, which connector 14 outputs via rearward electrical contacts 56 of PC board 34. Conversely, opto-electronic transceiver module 58 converts electronic signals that connector 14 receives via rearward electrical contacts 56 into optical signals. Connector 12 receives the optical signals from connector 14 and outputs the optical signals via transmit optical fiber 84 of cable 24.

In addition, connector system 10 can operate to transmit and receive electrical signals in essentially the same manner as a conventional (e.g., USB) connector system. That is, electrical signals that connector 14 receives via rearward electrical contacts 56 are communicated to connector 12 via the mating electrical contacts. Connector 12 outputs these electrical signals via wires (not shown for purposes of clarity) in cable 24. Conversely, electrical signals that connector 12 receives via the wires in cable 24 are communicated to connector 14 via the mating electrical contacts. Connector 14 outputs these electrical signals via rearward electrical contacts 56.

One or more illustrative embodiments of the invention have been described above. However, it is to be understood that the invention is defined by the appended claims and is not limited to the specific embodiments described.

What is claimed is:

1. A connector system, comprising:
a plug-configured first connector having a first-connector substantially planar contact holder, a first-connector electrical signal interface comprising a plurality of first-connector electrical contacts mounted on a mating side of the first substantially planar contact holder, a first-connector optical signal interface comprising a first-connector optical transmit port and a first-connector optical receive port, and a first-connector wiping cleaner mounted on the mating side of the first-connector substantially planar contact holder, the first-connector optical port disposed on the mating side of the first-connector substantially planar contact holder rearward of a distal end of the first-connector substantially planar contact holder, the first connector terminating a transmit optical fiber and a receive optical fiber; and
a socket-configured second connector having a second-connector substantially planar contact holder, a second-connector electrical signal interface comprising a plurality of second-connector electrical contacts mounted on a mating side of the second-connector substantially planar contact holder, a second-connector optical signal interface comprising a second-connector optical transmit port and a second-connector optical receive port, and a second-connector wiping cleaner mounted on the mating side of the second-connector substantially planar contact holder, the second-connector optical port disposed on the mating side of the second-connector substantially planar contact holder rearward of a distal end of the second substantially planar contact holder, the plug-configured first connector pluggable into the socket-configured second connector along a plugging direction, the first-connector optical transmit port approaching alignment with the second-connector optical transmit port along a transmit approach axis in the plugging direction as the first-connector and second-connector mating portions approach a fully mated position, the first-connector optical receive port approaching alignment with the second-connector optical receive port along a receive approach axis in the plugging direction as the first-connector and second-connector mating portions approach a fully mated position, the first-connector optical transmit port optically aligned with the second-connector optical transmit port along a transmit optical axis when the first-connector and second-connector mating portions are in the fully mated position, the first-connector optical receive port optically aligned with the second-connector optical receive port along a receive optical axis when the first-connector and second-connector mating portions are in the fully mated position, the plurality of first-connector electrical contacts contacting corresponding ones of the plurality of second-connector electrical contact when the first-connector and second-connector mating portions are in the fully mated position, the first-connector wiping cleaner disposed on the mating side of the first-connector substantially planar contact holder between the distal end of the first-connector substantially planar contact holder and the second-connector optical transmit and receive ports, the second-connector wiping cleaner disposed on the mating side of the second-connector substantially planar contact holder between the distal end of the second-connector substantially planar contact holder and the second-connector optical transmit and receive ports, whereby the second-connector wiping cleaner wipes the first-connector optical transmit and receive ports as the first-connector and second-connector mating portions approach the fully mated position, and the first-connector wiping cleaner wipes the second-connector optical transmit and receive ports as the first-connector and second-connector mating portions approach the fully mated position.

2. The connector system claimed in claim 1, wherein the second-connector wiping cleaner has an elongated bar shape.

3. The connector system claimed in claim 1, wherein the first connector includes a 90-degree reflector with respect to the transmit optical axis for reflecting an optical transmit signal emitted from the second-connector optical transmit port and through the first-connector optical transmit port along the transmit optical axis into an end of the transmit optical fiber and for reflecting an optical receive signal emitted from the end of the receive optical fiber through the first-connector optical receive port along the receive optical axis into the second-connector optical receive port.

4. The connector system claimed in claim 1, wherein:
the plurality of first-connector electrical contacts are elongated, finger-shaped, and arranged in a Universal Serial Bus (USB) configuration; and
the plurality of second-connector electrical contacts are elongated, finger-shaped, and arranged in a USB configuration.

5. The connector system claimed in claim 1, wherein one of the first and second connectors includes an opto-electronic transceiver having a light source and a light receiver.

* * * * *